(12) United States Patent
Grey et al.

(10) Patent No.: US 9,399,417 B1
(45) Date of Patent: Jul. 26, 2016

(54) ADVANCED COMFORT BUCKLING SYSTEM

(71) Applicants: David Grey, Platteville, CO (US); Stacy Grey, Platteville, CO (US)

(72) Inventors: David Grey, Platteville, CO (US); Stacy Grey, Platteville, CO (US)

(*) Notice: Subject to any disclaimer, the term of this patent is extended or adjusted under 35 U.S.C. 154(b) by 0 days.

(21) Appl. No.: 14/594,440

(22) Filed: Jan. 12, 2015

Related U.S. Application Data

(60) Provisional application No. 61/926,074, filed on Jan. 10, 2014.

(51) Int. Cl.
| | | |
|---|---|---|
| *A47C 1/08* | (2006.01) | |
| *B60N 2/26* | (2006.01) | |
| *A44B 11/26* | (2006.01) | |
| *B60N 2/28* | (2006.01) | |
| *B60N 2/46* | (2006.01) | |
| *B60N 2/68* | (2006.01) | |
| *B60R 22/10* | (2006.01) | |
| *B60R 22/34* | (2006.01) | |

(52) U.S. Cl.
CPC ............. *B60N 2/265* (2013.01); *A44B 11/26* (2013.01); *B60N 2/2842* (2013.01); *B60N 2/468* (2013.01); *B60N 2/688* (2013.01); *B60R 22/105* (2013.01); *B60R 22/34* (2013.01)

(58) Field of Classification Search
CPC .................................................... B60N 2/2812
USPC ..................................... 297/250.1, 467, 481
See application file for complete search history.

(56) References Cited

U.S. PATENT DOCUMENTS

| | | | |
|---|---|---|---|
| 4,210,365 A * | 7/1980 | Breitschwerdt | B60N 2/3013 |
| | | | 297/481 |
| 5,104,134 A | 4/1992 | Cone | |
| 6,305,745 B1 * | 10/2001 | Rijsdijk | B60N 2/2812 |
| | | | 297/250.1 |
| 6,478,372 B1 | 11/2002 | Lemmeyer et al. | |
| 6,685,266 B2 | 2/2004 | James et al. | |
| 7,585,026 B2 * | 9/2009 | Kassai | B62B 5/082 |
| | | | 297/250.1 |
| 7,845,734 B2 * | 12/2010 | Gomi | B60R 22/26 |
| | | | 297/481 |
| 8,308,231 B2 | 11/2012 | Haut | |
| 2002/0036419 A1 * | 3/2002 | Balensiefer | A47D 15/006 |
| | | | 297/250.1 |
| 2002/0109391 A1 * | 8/2002 | Shie | B60N 2/2812 |
| | | | 297/467 |
| 2004/0194264 A1 * | 10/2004 | Johansson | A44B 11/2592 |
| | | | 24/602 |
| 2011/0006572 A1 * | 1/2011 | Zhao | B60N 2/2812 |
| | | | 297/256.15 |
| 2012/0284968 A1 * | 11/2012 | Johnson | H01F 7/0263 |
| | | | 24/303 |
| 2013/0015691 A1 * | 1/2013 | Feng | B60N 2/2812 |
| | | | 297/250.1 |
| 2013/0285424 A1 * | 10/2013 | Gardner | B60N 2/2812 |
| | | | 297/250.1 |

\* cited by examiner

*Primary Examiner* — David R Dunn
*Assistant Examiner* — Alexander Harrison
(74) *Attorney, Agent, or Firm* — Wessels & Arsenault, LLC; John A. Arsenault; Daniel Dubuisson

(57) ABSTRACT

An improved safety seat buckling system and method of using the same for facilitating placement of a person into a safety seat is disclosed. A series of slots or fasteners placed on the armrest of the safety seat are fitted to interface with the buckle male end portions of the harness assembly. By placing each buckle male end portion into the corresponding slot, placement of a person into the seat prior to securing the person into the seat becomes easier. Less time is required to secure the person into the safety seat, and the need for the person to lean forward while securing the person into the seat is eliminated.

15 Claims, 3 Drawing Sheets

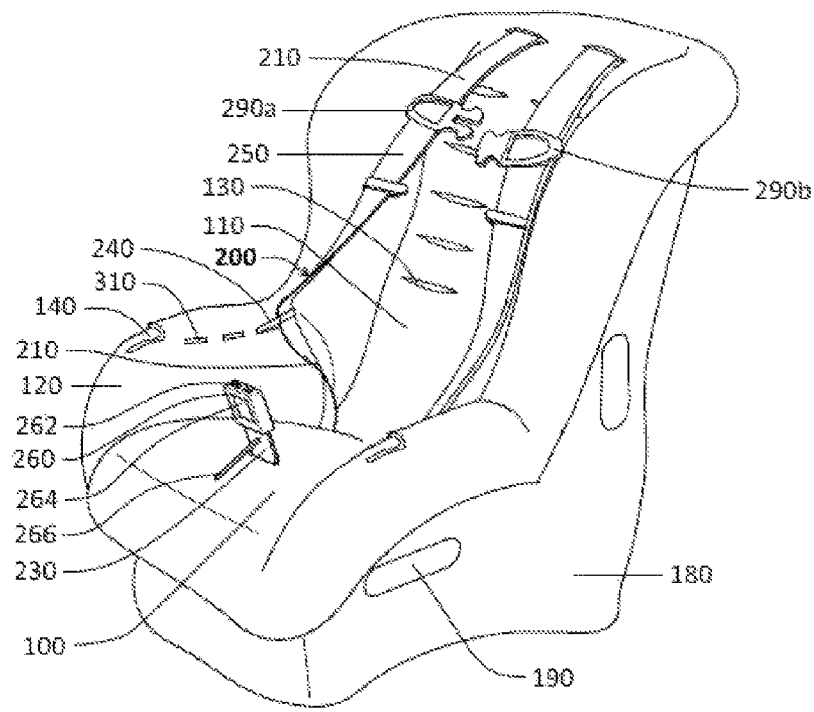
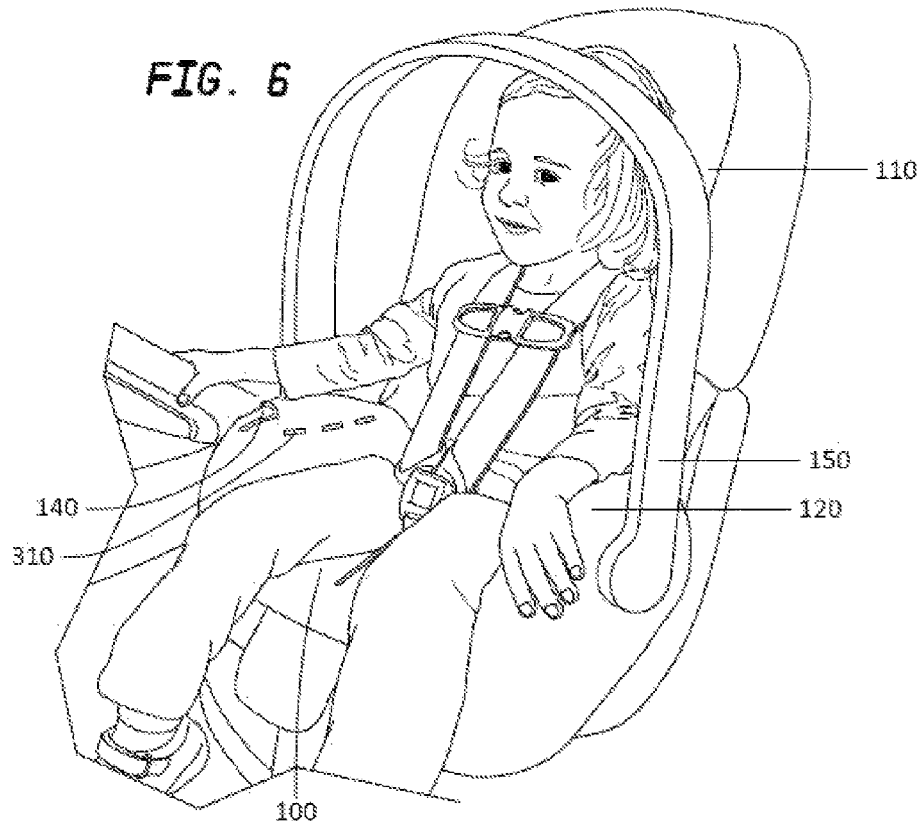

ADVANCED COMFORT BUCKLING SYSTEM

STATEMENT REGARDING FEDERALLY SPONSORED RESEARCH AND DEVELOPMENT

Not Applicable.

CROSS-REFERENCE TO RELATED APPLICATIONS

This application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

U.S. Provisional Patent Application App. No. 61/926,074 titled "Child Comfort Buckling System and Method of Using the Same," filed on Jan. 10, 2014, the subject matter of which is incorporated by reference herein.

RELATED APPLICATIONS

United States patent application No. To be Assigned, entitled ADVANCED COMFORT BUCKLING SYSTEM AND METHOD OF USING THE SAME, naming David Grey and Stacy Grey as inventors, filed 12 Jan. 2015 pursuant to 35 U.S.C. §119(e)(3), is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BACKGROUND OF DISCLOSURE

1. Field of Invention

The present invention relates to improvements in safety seats, and more particularly to safety seats having a multipoint harness buckling system wherein buckles can be fastened to slots located on the armrests or lift bar, thus reducing the time to secure a person into the safety seat.

2. Description of Prior Art

Safety seats exhibiting multipoint harness buckling systems are frequently used by racing enthusiasts, airline passengers, and children. While products developed thus far have improved safety by focusing on placement of shoulder and waist straps, they have lacked significant improvements in reducing the time to secure a person into the safety seat. Thus, it would be ideal to provide a product that would substantially reduce the time needed to securely strap a person into a safety seat.

Safety seats currently focus on ideal placement of safety harnesses to best secure a person to the seat. The benefit from improved placement of safety straps in a safety seat is a lower injury rate during accidents. However, the placement of buckles and harness straps on current safety seats is highly inconvenient and makes the process of securing a person to the seat more tedious. Safety seats in the prior art do not account for placement and location of the shoulder straps when a person is being placed into a safety seat; therefore, the securing process involves unnecessary extra steps. The prior art inefficiently teaches to rest shoulder harnesses against the backrest of a safety seat.

U.S. Pat. No. 5,104,134 issued to Cone discloses a convertible child's combination car seat and stroller, with slots placed on the armrests. However, the armrests are disclosed to be used for seat belts in the vehicle. The slots on the armrests are not used nor are they conceived to be able to adequately secure harness shoulder straps while placing a child or infant in the seat. A child or infant must still be moved forward in order to adjust the harness shoulder straps outward to secure the child or infant into the disclosed combination safety seat.

The Child Seat Device in U.S. Pat. No. 6,685,266, to Reagan et al. discloses a child seat with slots placed along the armrests; however, the armrests are disclosed to be used for the vehicle seat belts or as a securing point to a vehicle. The slots on the armrests are not used nor are they conceived to be able to adequately secure harness shoulder straps while placing a child in the safety seat, nor is it designed to facilitate placement of the child into the seat.

U.S. Pat. No. 6,478,372, to Lenmeyer et al. discloses armrests for infant or child car seats that include a slot along the armrests spaced cantilever from the seat portion. The armrests are intended to receive a box-shaped drink, so that potential movement of the drink box is inhibited when the vehicle is in motion. The armrests disclosed in the Lenmeyer et al. patent are not intended to interface and secure harness straps before placing a child in the safety seat.

The Child Safety Seat, U.S. Pat. No. 8,308,231, to Haut, discloses a storage area with one or more storage spaces where a parent, infant, or child can store one or more objects commonly used in baby care such as food, a drink, or toy. The storage spaces are intended to receive items for personal use and are not intended to secure the shoulder straps of a child seat to facilitate placement of the child or infant in a child seat. The invention to Haut does not improve or facilitate securing of the harness shoulder straps on a child in a safety seat.

Some armrests have been designed with a slot for receipt of a plug capable of transmission of electronic or video signals, as disclosed in U.S. Pat. No. 5,611,513, to Rosen. The invention to Rosen also does not improve or facilitate securing of the buckles or harness straps in a safety seat.

The aforementioned armrest embodiments on safety seats can be improved upon to receive a person and more easily secure a person into a safety seat without having to pull the shoulder straps out from behind the person after they are placed or place themselves into the safety seat. When using the aforementioned armrest embodiments, a person is generally in a state of discomfort from having to sit or lay on the harness assembly, and further discomfort or possible injury ensues when the person retrieves the harness assembly from behind and underneath the person in order to complete the buckling process. Thus, there is a need for an inexpensive system and method to help easily secure a person into a safety seat while avoiding the inconvenience of the safety straps that make securing difficult. The present invention accomplishes this and several other goals.

SUMMARY OF THE DISCLOSURE

The present invention provides an improved advanced safety seat buckling system and method wherein harness assembly components can be secured into the armrest and away from the seating area of the safety seat.

In a primary embodiment of the present invention, at least one buckle end portion of a harness assembly reversibly fastens to slots located on at least one armrest of the safety seat.

In an embodiment, a plurality of slits in the backrest and at least one slot in an armrest are used in conjunction to account for the size variation of persons to be secured to the safety seat.

In an embodiment of the present invention, a retractor cord interconnecting the seat portion and at least one buckle end portion or at least one harness strap further enhances the securing of a child to a safety seat by positioning a buckle end portion away from the backrest while in unbuckled configuration.

The present system and method of use is intended to be simple as well as inexpensive to manufacture and assemble.

Embodiments include one, more, or any combination of all of the features listed above.

Other features and advantages of the present invention will become apparent from the following more detailed description, taken in conjunction with the accompanying, which illustrate, by way of example, the principles of the invention.

DESCRIPTION OF THE DRAWINGS

FIG. 5 is a perspective view of a child safety seat wherein a buckle male end portion of the multipoint harness are stored into an armrest slot, in accordance with an exemplary embodiment of the present invention; and FIG. 6 is a perspective view of a child safety seat wherein a child is securely buckled in the safety seat, in accordance with an exemplary embodiment of the present invention.

Figure 1:
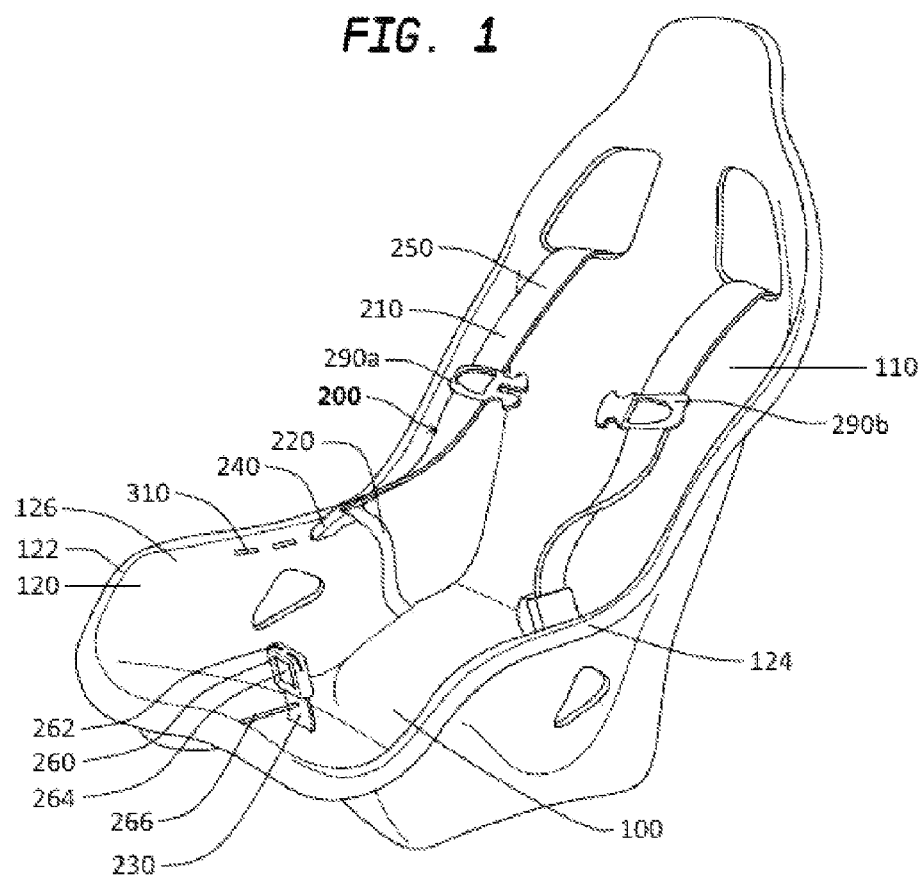
FIG. 1 is a perspective view of a safety seat wherein buckle male end portions of a multipoint harness assembly are stored into armrest slots, in accordance with an exemplary embodiment of the present invention.

REFERENCE NUMERALS IN THE DRAWINGS seat portion 100
backrest 110
armrest 120
armrest topside 122
armrest outer-side 124
armrest inner-side 126
slit 130
strap hook 140
lift bar 150
safety seat base 180
port 190
harness assembly 200
harness shoulder strap 210
harness waist strap 220
harness adjuster strap 230
buckle male end portion 240
indentation 242
harness strap 250
harness strap end 252
buckle female end portion 260
buckle female end opening 262
buckle release mechanism 264
retractor cord 266
retractor cord end 268
chest clip portion 290*a*
chest clip portion 290*b*
slot 310
ridge 320

DETAILED DESCRIPTION OF THE DISCLOSED EMBODIMENT

Illustrative embodiments of the invention are described below in the accompanying Figures. The following detailed description provides detailed schematics for a thorough understanding of and an enabling description for these embodiments. One having ordinary skill in the art will understand that the invention may be practiced without certain details. In other instances, well-known structures and functions have not been shown or described in detail to avoid unnecessarily obscuring the description of the embodiments.

FIG. 1 is a perspective view of a safety seat wherein buckle male end portions 240 of a multipoint harness assembly 200 are stored into armrest slots 310, in accordance with an exemplary embodiment of the present invention. The safety seat comprises seat portion 100, a backrest 110, armrests 120, and a harness assembly 200, which generally comprises at least one buckle male end portion 240, at least one buckle female end portion 260, and at least one harness strap 250, such as a harness waist strap 220, harness shoulder strap 210, or harness adjustor strap 230. Many examples herein describe the use of a five-point harness assembly 200; however for the purposes of the present description, the term "harness assembly" may refer to any general type of safety restraint, which includes, but is not limited to any multipoint harness assembly, safety belt, lanyard, or lifeline. A harness assembly 200 in example embodiments described herein may comprise at least one harness shoulder strap 210, at least one harness waist strap 220, and at least one buckle male end portion 240. Embodiments described herein may also include at least one harness adjuster strap 230, wherein the length of this particular type of harness strap 250 may be varied.

The five-point harness assembly described in embodiments herein comprises, in combination (a) two buckle male end portions 240 each attached to and interconnecting a harness shoulder strap 210 and a harness waist strap 220, and each comprising an indentation 242, and (b) one buckle female end portion 260 comprising at least one buckle female end opening 262 wherein buckle male end portions 240 are inserted and fasten reversibly via one or more indentations 242 located on said buckle male end portions 240, and a buckle release mechanism 264 located on said buckle female end portion 260. The harness shoulder straps 210 and shoulder waist straps 220 are fastened to the posterior of the backrest 110, and the buckle female end portion 260 is fastened to the underside of the seat portion 100. In the example embodiments described herein, the term indentation 242 may refer to a cutaway, a hole, a recess, or a pit. In the example in FIG. 1, the harness assembly 200 further comprises chest clip portions 290a and 290b, designed to interconnect and reversibly fasten to each other via a fastening means, which may be standard mechanical male end to female end fasteners, magnets housed within clip portions 290a and 290b, a carabiner, or any combination thereof, to further enhance the safe securing of a person to the safety seat. A retractor cord 266, which may be manufactured from a material exhibiting at least partial elasticity, interconnects said seat portion 100 to said harness adjuster strap 230 or said buckle female end portion 260 and pulls an unbuckled buckle female end portion 260 away from seat portion 100 adjacent to the backrest mechanism 264 may be used to unbuckle or unfasten at least one buckle female end portion 260 from at least one buckle male end portion 240.

The armrests 120 are generally placed cantilever to the backrest 110 and may comprise various components, such as cup holders, toys, etc. Regarding the example in FIG. 1, the armrest further comprises a top side 122, an outer side 124 and an inner side 126; however, it is contemplated that several forms of armrests 120 are suitable. Each armrest 120 houses one or more slots 310 to reversibly fasten with a buckle male end portion 240. Slots 310 may be aligned parallel or perpendicular to each other and may be positioned anywhere on the armrest capable of receiving a buckle male end portions 240.

Figure 2:
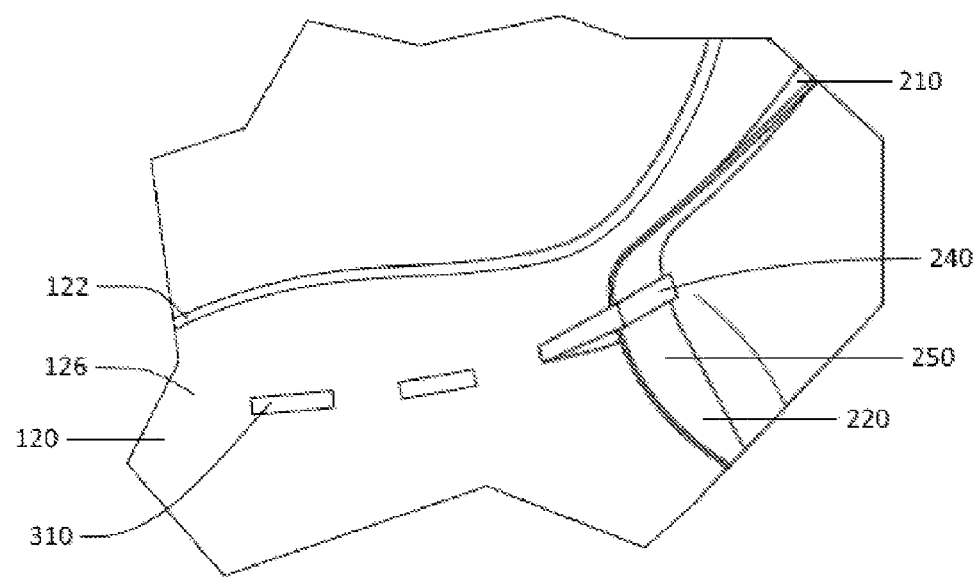
FIG. 2 is an enlarged perspective view of a safety seat armrest wherein a buckle male end portion of a multipoint harness assembly is stored into a slot in the armrests, in accordance with an exemplary embodiment of the present invention.

FIG. 2 is an enlarged perspective view of a safety seat armrest 120 wherein buckle male end portions 240 of a multipoint harness assembly 200 are stored into slots 310 in an armrest 120, in accordance with an exemplary embodiment of the present invention. With buckle male end portions 240 secured into slots 310, any harness shoulder straps 210 or harness waist straps 220 fastened to the buckle male end portions 240 are also secured away from the seating area of the safety seat and towards the armrests 120.

Figure 3:
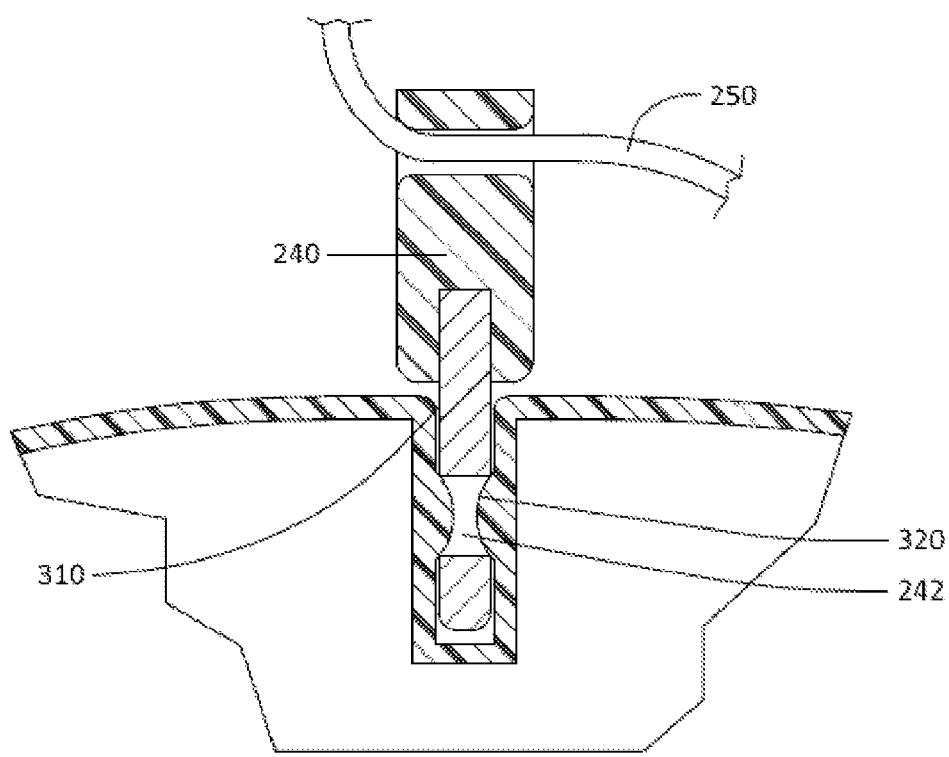
FIG. 3 is an enlarged side view of a slot wherein a buckle male end portion of a multipoint harness assembly is stored, in accordance with an exemplary embodiment of the present invention.

FIG. 3 is an enlarged side view of a slot 310 wherein a buckle male end portion 240 of a multipoint harness assembly 200 is stored, in accordance with an exemplary embodiment of the present invention. A variety of forms and arrangements may be used to fasten a slot 310 to receive a buckle male end portion 240. In the example in FIG. 3, the slots 310 comprise one or more ridges 320 protruding inward within each slot 310 with each ridge 320 designed to insert into the indention 242 of a buckle male end portion 240. It is generally desirable that both armrests 120 have a plurality of slots 310 to account for the size of the person.

Figure 4:
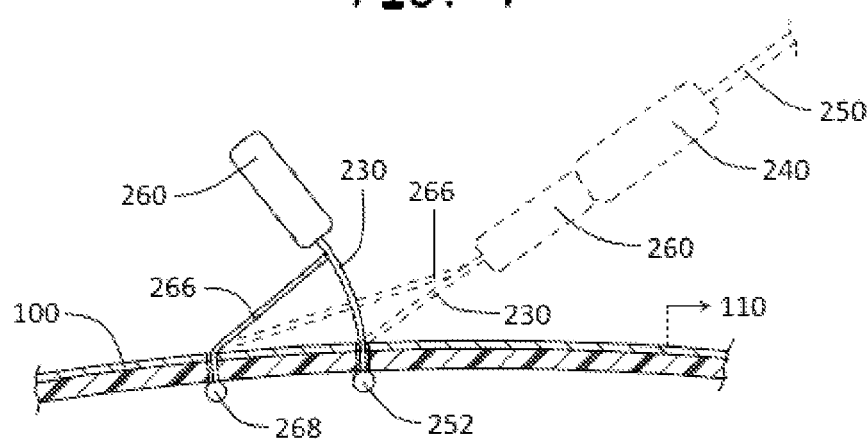
FIG. 4 is a side view of a buckle female end portion in unbuckled and buckled configurations, in which the dashed lines show a buckled configuration and the solid lines show an unbuckled configuration, in accordance with an exemplary embodiment of the present invention.

FIG. 4 is a side view of a buckle female end portion 260 in unbuckled and buckled configurations, in which the dashed lines show a buckled configuration and the solid lines show an unbuckled configuration, in accordance with an exemplary embodiment of the present invention. In the unbuckled configuration, buckle female end portion 260 is positioned away from the backrest 110 via a retractor cord 260. A person may then be placed into the safety seat without needing to remove the buckle female end portion 260 or harness adjuster strap 230 from the seat portion 100 proximate to the backrest 110; the person may then easily access the buckle female end portion 260 for quick fastening to buckle male end portions 240. A harness strap end 252 fastens harness straps 250 to various locations on the safety seat. Similarly, a retractor cord end 268 fastens retractor cord 260 to the seat portion 100. Harness strap ends 252 and retractor cord end 268 may take the form of a ball, a plate, or other geometric shapes, or of a carabiner or of a clip movable along and attachable at any point along the length of either a harness strap 250 or a retractor cord 266.

FIG. 5 is a perspective view of a safety seat wherein a buckle male end portion 240 of a multipoint harness assembly 200 are stored into a armrest slot 310, in accordance with an exemplary embodiment of the present invention. In this example embodiment, the backrest 110 further comprises a plurality of slits 130 that allow harness shoulder straps 210 to be installed at different locations along the backrest 110. The harness shoulder straps 210 are generally designed to be placed through the slits 130 at a location above the shoulders of the person to be secured and may be placed into one or more of a plurality of slits 130 to account for the size of the person. Slits 130 may be oriented parallel, perpendicular, or at other angles relative to one another, or slits 130 may be oriented in pairs of two wherein the pairs are parallel, perpendicular, plurality of slots 310 and a plurality of slits 130, this invention is able to secure a person of generally any size into the safety seat. The underside of safety seats in many of the embodiments described herein comprises a safety seat base 180 which may provide extra mechanical support or increase comfort to a person sitting in the safety seat. In many cases, a safety seat base comprises at least one port 190 located on the safety seat base 180 for vehicle seat belt straps to pass through, thus enhancing the ability of a user to secure a safety seat to a vehicle seat, either in forward or reverse directions.

FIG. 6 is a perspective view of a child safety seat wherein a child is securely buckled in the safety seat, in accordance with an exemplary embodiment of the present invention. The safety seat in this example embodiment further comprises a lift bar 150, which allows the safety seat to be carried, and one or more strap hooks 140, which are generally located on or near at least one armrest 120 and can receive vehicle seat belt harness components to further enhance the ability to install a safety seat into a vehicle seat in the reverse direction. In general, a lift bar 150 is fastened to both the left and right sides of a safety seat or to both armrests 120 of a safety seat and extends over the seating area; however, the lift bar 150 may be rotated as needed towards the seat portion 100 or backrest 110. It is contemplated that installation of the safety seat into a vehicle seat in the reverse direction may also be accomplished via ports 190 near the bottom side of the safety seat, as in the example shown in FIG. 5. In an embodiment, the lift bar 150 also comprises at least one slot 310.

A method for using the presently described system to secure a person to a safety seat generally comprises the steps of fastening at least one buckle male end portion 240 to at least one slot 310, placing a person into the safety seat, detaching the buckle male end portion 240 from portion 260. During the initial phase of the method for using the presently described system, the buckle male end portions 240 are stored into slots 310 on an armrest 120 or a lift bar 150. Additionally, a retractor cord 266 may direct the buckle female end portion 260 in its unbuckled configuration away from the backrest 110. To this initial configuration, a person can be placed into the safety seat, with the person's bottom and back rested firmly upon the seat portion 100 and backrest 110, respectively, while each of the buckle male end portions 240 is stored into a slot 310 within an armrest 120 or lift bar 150. A person is then placed into the safety seat and does not need to spend time removing components of the harness assembly 200 from the seat portion 100 or backrest 110. The buckle male end portions 240 can then detach from the slots 310 and then fasten to the buckle female end portion 260.

A method for using the presently described system to expel a person from a safety seat generally comprises the steps of detaching buckle male end portions 240 from at least one buckle female end portion 260, then removing the person from the safety seat. Furthermore, the method may further comprise a subsequent step of fastening at least one buckle male end portion 240 to at least one slot 310, an embodiment of the present invention that enables a user to prepare the safety seat for quickly placing a person into the safety seat at a time subsequent to removing the person from the safety seat rather than at a time just prior to placing the person into the safety seat. Furthermore, the method may further comprise a subsequent step of fastening the buckle male end portion 240 to at least one slot 310 located on an armrest 120 or on a lift bar 150 of a safety seat, an embodiment that enables a user to prepare the safety seat for quickly placing a person into the safety seat at a time subsequent to removing the person from the safety seat rather than at a time just prior to placing the person into the safety seat.

Many of the examples described above utilize a single molded component to incorporate a seat portion 100, a backrest 110, and armrests 120. This type of system is intended to ease the process of manufacturing the invention; however, it is not necessary that a single molded component be used, and the example should not be construed to limit the invention to utilizing a single molded component. Additionally, embodiments are contemplated wherein the positions of said buckle male end portion 240 and said buckle female end portion 260 may be reversed, and slots 310 described herein adapted to reversibly fasten to a buckle female end portion 260.

While the above described embodiments of the invention is applied directly to a safety seat, the embodiment may also be applied to other types of seating which include, but are not limited to booster seats, child carriers, fastened carrycots, strollers, wheelchairs, race vehicle seat, or airline seats, seats used by government or military personnel, etc.

The above example describes the use of "person", however for the purposes of the present description, the term "person" may refer to any general type of small human being or primate.

While particular embodiments of the invention have been described and disclosed in the present application, it is clear that any number of permutations, modifications, or embodiments may be made without departing from the spirit and the scope of this invention. Accordingly, it is not the inventor's intention to limit this invention in this application, except as by the claims.

Particular terminology used when describing certain features or aspects of the invention should not be taken to imply that the terminology is being redefined herein to be restricted to any specific characteristics, features, or aspects of the invention with which that terminology is associated. In general, the terms used in the claims should not be construed to limit the invention section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize.

Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

In light of the above "Detailed Description," Inventor may make changes to the invention. While the detailed description outlines possible embodiments of the invention and invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

We claim:

1. A safety seat, comprising:
   a seat portion;
   a backrest;
   a harness assembly comprising at least one buckle male end portion secured to a harness strap, at least one buckle female end portion secured to a harness adjuster strap, said harness adjuster strap secured to said seat portion;
   a plurality of armrests, wherein at least one of said armrests comprises at least one slot for securing said buckle male end portion and said harness strap away from said seat portion or said backrest, wherein said slot releasably fastens to said buckle male end portion;
   a retractor cord for biasing said buckle female end portion or said harness adjuster strap away from said backrest, wherein said retractor cord interconnects said seat portion to said harness adjuster strap or said buckle female end portion; and
   a retractor cord end for securing a bottom end of said retractor cord to said seat portion, wherein said retractor cord end is fastened directly to said bottom end of said retractor cord and engages said seat portion in a position spaced from said harness adjuster strap.

2. The safety seat of claim 1, wherein said harness assembly is a five-point harness assembly.

3. The safety seat of claim 1, wherein said safety seat further comprises at least one strap hook for securing said safety seat to a vehicle seat, wherein said strap hook is located on or in proximity to one of said armrests.

4. The safety seat of claim 1, wherein said harness assembly further comprises chest clip portions.

5. The safety seat of claim 1, wherein said backrest further comprises at least one slit wherein said harness strap passes through.

6. The safety seat of claim 1, wherein said seat portion, said backrest, and said armrests comprise a single molded component.

7. The safety seat of claim 1, wherein said safety seat further comprises a lift bar.

8. The safety seat of claim 1, wherein said harness strap comprises at least one harness shoulder strap and at least one harness waist strap.

9. The safety seat of claim 1, wherein said harness assembly comprises:
   two buckle male end portions each attached to and interconnecting a harness shoulder strap and a harness waist strap, and each comprising an indentation;
   said buckle female end portion comprising at least one buckle female end opening wherein at least one buckle male end portion is inserted and fastens reversibly via one or more of said indentation located on said buckle male end portions; and
   a buckle release mechanism located on said buckle female end portion.

10. The safety seat of claim 1, wherein said safety seat comprises a safety seat base.

11. The safety seat of claim 4, wherein said chest clip portions are interconnected by a fastening means selected from a group consisting of a standard mechanical male end to female end fasteners, a carabiner, and a pair of magnetically attractive materials.

12. The safety seat of claim 7, wherein said lift bar comprises at least one slot for securing said buckle male end portion or said harness strap away from said seat portion or said backrest, wherein said slot releasably fastens to said buckle male end portion.

13. The safety seat of claim 10, wherein said safety seat base comprises at least one port for securing said safety seat to a vehicle seat, wherein said port is located on said safety seat base.

14. The safety seat of claim 1, wherein said retractor cord end is selected from a group consisting of a ball, a plate, other geometric shapes, and a carabiner.

15. The safety seat of claim 9, wherein said indentation is selected from the group consisting of a cutaway, a hole, a recess, and a pit.

* * * * *